United States Patent
Chakraborty et al.

(10) Patent No.: US 11,466,354 B2
(45) Date of Patent: *Oct. 11, 2022

(54) METHOD FOR THE MANUFACTURE OF A COATED STEEL SHEET

(71) Applicant: ArcelorMittal, Luxembourg (LU)

(72) Inventors: Anirban Chakraborty, Saint John, IN (US); Hassan Ghassemi-Armaki, Schererville, IN (US)

(73) Assignee: ArcelorMittal, Luxembourg (LU)

( * ) Notice: Subject to any disclaimer, the term of this patent is extended or adjusted under 35 U.S.C. 154(b) by 154 days.

This patent is subject to a terminal disclaimer.

(21) Appl. No.: 16/753,739

(22) PCT Filed: Oct. 19, 2018

(86) PCT No.: PCT/IB2018/058154
§ 371 (c)(1),
(2) Date: Apr. 3, 2020

(87) PCT Pub. No.: WO2019/082035
PCT Pub. Date: May 2, 2019

(65) Prior Publication Data
US 2020/0277693 A1      Sep. 3, 2020

(30) Foreign Application Priority Data
Oct. 24, 2017   (WO) .................. PCT/IB2017/001282

(51) Int. Cl.
*C23C 2/02* (2006.01)
*B32B 15/01* (2006.01)
(Continued)

(52) U.S. Cl.
CPC .............. *C23C 2/02* (2013.01); *B32B 15/012* (2013.01); *B32B 15/015* (2013.01); *C21D 6/002* (2013.01);
(Continued)

(58) Field of Classification Search
CPC ................ B32B 15/012; B32B 15/015; C21D 2211/001; C21D 2211/002;
(Continued)

(56) References Cited

U.S. PATENT DOCUMENTS

2012/0100391 A1   4/2012   Lee et al.
2014/0349133 A1   11/2014  Lee et al.
(Continued)

FOREIGN PATENT DOCUMENTS

EP   2143816 A1   1/2010
EP   2631319 A1   8/2013
(Continued)

OTHER PUBLICATIONS

International Search Report of PCT/IB2018/058991, dated Feb. 15, 2019.
(Continued)

*Primary Examiner* — Jenny R Wu
(74) *Attorney, Agent, or Firm* — Davidson, Davidson & Kappel, LLC

(57) ABSTRACT

Method for the manufacture of a coated steel sheet including the following step of A) the provision of a pre-coated steel sheet coating with a first coating including iron and nickel, B) the thermal treatment of such pre-coated steel sheet at a temperature between 600 and 1000° C., and C) the coating of the steel sheet obtained in step B) with a second coating based on zinc.

16 Claims, 1 Drawing Sheet

(51) Int. Cl.
  *C21D 6/00* (2006.01)
  *C21D 9/46* (2006.01)
  *C22C 19/03* (2006.01)
  *C22C 38/06* (2006.01)
  *C22C 38/22* (2006.01)
  *C22C 38/34* (2006.01)
  *C22C 38/38* (2006.01)
  *C23C 2/06* (2006.01)
  *C23C 2/40* (2006.01)
  *C23C 28/02* (2006.01)

(52) U.S. Cl.
  CPC .............. *C21D 6/005* (2013.01); *C21D 6/008* (2013.01); *C21D 9/46* (2013.01); *C22C 19/03* (2013.01); *C22C 38/06* (2013.01); *C22C 38/22* (2013.01); *C22C 38/34* (2013.01); *C22C 38/38* (2013.01); *C23C 2/06* (2013.01); *C23C 2/40* (2013.01); *C23C 28/021* (2013.01); *C21D 2211/001* (2013.01); *C21D 2211/002* (2013.01); *C21D 2211/005* (2013.01); *C21D 2211/008* (2013.01); *C23C 28/025* (2013.01)

(58) Field of Classification Search
  CPC ........ C21D 2211/005; C21D 2211/008; C21D 6/002; C21D 6/005; C21D 6/008; C21D 9/46; C22C 19/03; C22C 38/06; C22C 38/22; C22C 38/34; C22C 38/38; C23C 2/02; C23C 2/06; C23C 2/40; C23C 28/02; C23C 28/021; C23C 28/025; C25D 7/0614
  See application file for complete search history.

(56) References Cited

U.S. PATENT DOCUMENTS

2014/0370330 A1 12/2014 Sato et al.
2016/0082701 A1 3/2016 Kurosaki

FOREIGN PATENT DOCUMENTS

| | | |
|---|---|---|
| EP | 3088557 A1 | 11/2016 |
| JP | S589965 | 1/1983 |
| JP | 2 561331 B2 | 12/1996 |
| JP | 2004124187 A | 4/2004 |
| JP | 2008144264 A * | 6/2008 |
| JP | 2008144264 A | 6/2008 |
| KR | 20120074144 A | 7/2012 |
| KR | 20120074145 A * | 7/2012 |
| WO | 2014124749 A1 | 8/2014 |
| WO | 2019082035 A1 | 5/2019 |
| WO | 2019082036 A1 | 5/2019 |
| WO | 2019082037 A1 | 5/2019 |
| WO | 2019082038 A1 | 5/2019 |

OTHER PUBLICATIONS

See International Search Report of PCT/IB2018/058158, dated Feb. 14, 2019.
See International Search Report of PCT/IB2018/058155, dated Dec. 21, 2018.
See International Search Report of PCT/IB2018/058154, dated Dec. 3, 2018.
See International Search Report of PCT/IB2018/058157, dated Dec. 3, 2018.

* cited by examiner

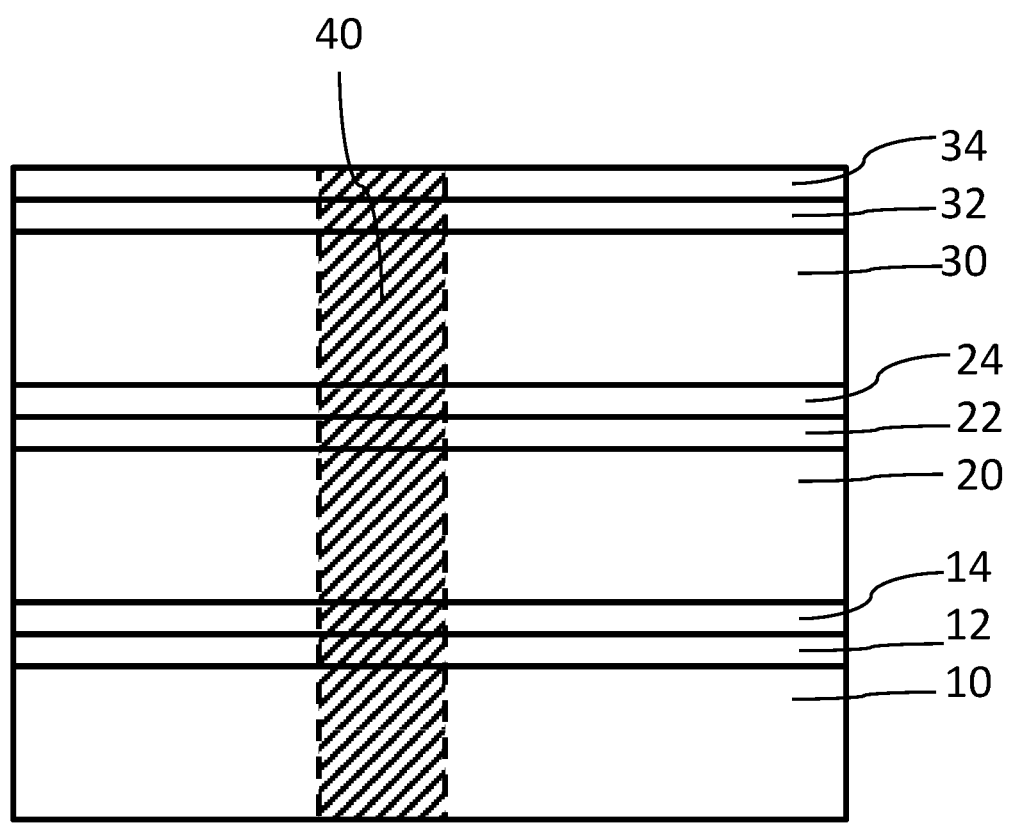

METHOD FOR THE MANUFACTURE OF A COATED STEEL SHEET

The present invention relates to a method for the manufacture of a coated steel sheet. The invention is particularly well suited for the manufacture of automotive vehicles.

BACKGROUND

Zinc based coatings are generally used because they allow for protection against corrosion, thanks to barrier protection and cathodic protection. The barrier effect is obtained by the application of the metallic coating on steel surface. Thus, the metallic coating prevents the contact between steel and corrosive atmosphere. The barrier effect is independent from the nature of the coating and the substrate. On the contrary, sacrificial cathodic protection is based on the fact that zinc is a metal less noble than steel. Thus, if corrosion occurs, zinc is consumed preferentially as compared to steel. Cathodic protection is essential in areas where steel is directly exposed to corrosive atmosphere, like cut edges where surrounding zinc will be consumed before steel.

However, when heating steps are performed on such zinc coated steel sheets, for example hot press hardening or welding, cracks are observed in steel which spread from the steel/coating interface. Indeed, occasionally, there is a reduction of metal mechanical properties due to the presence of cracks in coated steel sheet after above operation. These cracks appear with the following conditions: high temperature; contact with a liquid metal having a low melting point (such as zinc) in addition to the presence of tensile stress; heterogeneous diffusion of molten metal in substrate grain and grain boundaries. The designation for such phenomenon is known as liquid metal embrittlement (LME), also called liquid metal assisted cracking (LMAC).

US2012/0100391 discloses a method for manufacturing a hot-dip galvanized steel sheet having good plating qualities, plating adhesion and spot weldability, the method comprising:

coating a base steel sheet with Ni in a coating amount ($C_{Ni}$) of 0.1-1.0 g/m²;

heating the Ni-coated steel sheet in a reducing atmosphere;

cooling the heated steel sheet to the temperature ($X_S$) at which the steel sheet is fed into a galvanizing bath; and feeding and immersing the cooled steel sheet in the galvanizing bath having an effective Al concentration ($C_{Al}$) of 0.11-0.14 wt % and a temperature ($T_p$) of 440-460° C., wherein the temperature ($X_S$) at which the steel sheet is fed into the galvanizing bath satisfies the following relationship: $C_{Ni} \cdot (X_S - T_p)/2C_{Al} = 5-100$.

It also discloses a hot-dip galvanized steel sheet wherein the alloy phase is a Fe—Zn alloy phase accounting for 1-20% of the cross-sectional area of the galvanized layer.

SUMMARY OF THE INVENTION

However, in the above method, galvanizing was carried out in a bath containing from 0.11 to 0.14 wt. % of Al and thus inhibition layer was very week and Fe—Zn intermetallic phases formed. At the industrial scale, this method is difficult to apply since the spot weldability depends on controlling parameters, including the amount of Ni in the coating, the Al concentration of the galvanizing bath, and the difference between the temperature of the galvanizing bath and the temperature at which the steel sheet is fed into the galvanizing bath. Moreover, the spot weldability performed is evaluated based on the electrode life, i.e. the number of continuous welding spots at the time when the nugget diameter reached 4√t (t: steel sheet thickness) was measured. There is no mention of a reduction of the presence of cracks in coated steel sheet after the spot welding.

It is an object of the present invention to provide a steel sheet coated with a metallic coating which does not have LME issues. It aims to make available, in particular, an easy to implement method in order to obtain a part which does not have LME issues after the forming and/or the welding.

The present invention provides a method for the manufacture of a coated steel sheet comprising the following step of A) the provision of a pre-coated steel sheet coating with a first coating comprising iron and nickel, B) the thermal treatment of such pre-coated steel sheet at a temperature between 600 and 1000° C., C) the coating of the steel sheet obtained in step B) with a second coating based on zinc.

The present invention also provides a steel sheet obtainable from the method and coated with a diffused alloy layer comprising iron and nickel, such layer being directly topped by a zinc based layer.

The present invention also provides a spot welded joint of at least two metal sheets comprising at least a steel sheet obtainable from the method, said joint containing less than 3 cracks having a size above 100 μm and wherein the longest crack has a length below 500 μm.

The present invention also provides a spot welded joint, wherein the second metal sheet is a steel sheet or an aluminum sheet.

The present invention also provides the use of a coated steel sheet for the manufacture of an automotive vehicle part.

Other characteristics and advantages of the invention will become apparent from the following detailed description of the invention.

BRIEF DESCRIPTION OF THE DRAWING

FIG. 1 shows schematically a non-limiting example of a spot welded joint with three steel sheets made according to the present invention.

DETAILED DESCRIPTION

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 980 MPa, advantageously above or equal to 1180 MPa and even above or equal 1470 MPa.

The invention relates to a method for the manufacture of a coated steel sheet comprising the following step:

A. the provision of a pre-coated steel sheet coating with a first coating comprising iron and nickel, B. the thermal treatment of such pre-coated steel sheet at a temperature between 600 and 1000° C., C. the coating of the steel sheet obtained in step B) with a second coating based on zinc.

Without willing to be bound by any theory, it is an essential feature of the present invention to deposit the first coating of iron and nickel on the sheet steel before the thermal treatment since during the thermal treatment, on the one hand, Ni diffuses towards the steel sheet allowing a Fe—Ni alloy layer. On the other hand, some amount of Ni is still present at the interface between the steel and the coating interface preventing liquid zinc penetration into steel during any heating steps being for example a welding. Thus, by applying the method according to the present invention, it is possible to obtain a barrier layer to LME.

The first coating comprising iron and nickel is deposited by any deposition method known by the person skilled in the art. It can be deposited by vacuum deposition or electro-plating method. Preferably, it is deposited by electro-plating method.

Preferably, in step A), the first coating comprises from 10% to 75%, more preferably between 25 to 65% and advantageously between 40 to 60% by weight of iron.

Preferably, in step A), the first coating comprises from 25 to 90%, preferably from 35 to 75% and advantageously from 40 to 60% by weight of nickel.

In a preferred embodiment, in step A), the first coating consists of iron and nickel.

Preferably, in step A), the first coating has a thickness equal or above 0.5 μm. More preferably, the first coating has a thickness between 0.8 and 5.0 μm and advantageously between 1.0 and 2.0 μm.

Preferably, in step A), the steel sheet composition comprises by weight:
0.10<C<0.40%,
1.5<Mn<3.0%,
0.7<Si<2.0%,
0.05<Al<1.0%,
0.75<(Si+Al)<3.0%,
and on a purely optional basis, one or more elements such as
Nb≤0.5%,
B≤0.005%,
Cr≤1.0%,
Mo≤0.50%,
Ni≤1.0%,
Ti≤0.5%,
the remainder of the composition making up of iron and inevitable impurities resulting from the elaboration.

Preferably, in step B), the thermal treatment is a continuous annealing. For example, the continuous annealing comprises a heating, a soaking and a cooling step. It can further comprises a pre-heating step.

Advantageously, the thermal treatment is performed in an atmosphere comprising from 1 to 30% of $H_2$ at a dew point between −10 and −60° C. For example, the atmosphere comprises from 1 to 10% of $H_2$ at a dew point between −40° C. and −60° C.

Advantageously, in step C), the second layer comprises above 50%, more preferably above 75% of zinc and advantageously above 90% of zinc. The second layer can be deposited by any deposition method known by the man skilled in the art. It can be by hot-dip coating, by vacuum deposition or by electro-galvanizing.

For example, the coating based on zinc comprises from 0.01 to 8.0% Al, optionally 0.2-8.0% Mg, the remainder being Zn.

Preferably, the coating based on zinc is deposited by hot-dip galvanizing. In this embodiment, the molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

In a preferred embodiment, the second layer consists of zinc. When the coating is deposited by hot-dip galvanizing, the percentage of Al is comprised between 0.15 and 0.40 wt. % in the bath. Moreover, the iron presents in the first coating reacts with aluminum in order to form the inhibition layer $Fe_2Al_5$ and thus provide reactive wetting behavior during hot dip galvanizing.

With the method according to the present invention, a steel sheet coated with a diffused alloy layer comprising iron and nickel, such layer being directly topped by a zinc based layer is obtained. It is believed that the diffused alloy layer acts like a barrier layer to LME and improves the coating adhesion.

Preferably, the steel sheet has a microstructure comprising from 1 to 50% of residual austenite, from 1 to 60% of martensite and optionally at least one element chosen from: bainite, ferrite, cementite and pearlite. In this case, the martensite can be tempered or untempered.

In a preferred embodiment, the steel sheet has a microstructure comprising from 5 to 25% of residual austenite.

Preferably, the steel sheet has a microstructure comprising from 1 to 60% and more preferably between 10 to 60% of tempered martensite.

Advantageously, the steel sheet has a microstructure comprising from 10 to 40% of bainite, such bainite comprising from 10 to 20% of lower bainite, from 0 to 15% of upper bainite and from 0 to 5% of carbide free bainite.

Preferably, the steel sheet has a microstructure comprising from 1 to 25% of ferrite.

Preferably, the steel sheet has a microstructure comprising from 1 to 15% untempered martensite.

After the manufacture of a steel sheet, in order to produce some parts of a vehicle, it is known to assembly by welding two metal sheets. Thus, a spot welded joint is formed during the welding of at least two metal sheets, said spot being the link between the at least two metal sheets.

To produce a spot welded joint according to the invention, the welding is performed with an effective intensity is between 3 kA and 15 kA and the force applied on the electrodes is between 150 and 850 daN with said electrode active face diameter being between 4 and 10 mm.

Thus, a spot welded joint of at least two metal sheets, comprising the coated steel sheet according to the present invention, is obtained, such said joint containing less than 3 cracks having a size above 100 μm and wherein the longest crack has a length below 500 μm.

Preferably, the second metal sheet is a steel sheet or an aluminum sheet. More preferably, the second metal sheet is a steel sheet according to the present invention.

In another embodiment, the spot welded joint comprises a third metal sheet being a steel sheet or an aluminum sheet. For example, the third metal sheet is a steel sheet according to the present invention. FIG. 1 thus shows schematically a spot weld 40 for joining three metal sheets each with a steel substrate 10, 20, 30, first coating 12, 22, 32 and second coating 14, 24, 34, respectively.

The steel sheet or the spot welded joint according to the present invention can be used for the manufacture of parts for automotive vehicle.

The invention will now be explained in trials carried out for information only. They are not limiting.

EXAMPLE

For all samples, steel sheets used have the following composition in weight percent: C=0.37%, Mn=1.9 wt. %, Si=1.9 wt. %, Cr=0.35 wt. %, Al=0.05 wt. % and Mo=0.1 wt. %.

Trial 1 and 2 were prepared by deposited a first coating comprising 45% of Fe, the balance being Ni. Then, a continuous annealing was performed in an atmosphere comprising 5% of $H_2$ and 95% of $N_2$ at a dew point of −45° C. The pre-coated steel sheet was heated at a temperature of 900° C. Finally, a zinc coating was deposited by hot-dip galvanizing, the zinc bath comprising 0.2% of Al. The bath temperature was of 460° C.

For comparison purpose, Trial 3 was prepared by depositing a zinc coating by electro-galvanizing after the continuous annealing of the above steel sheet.

The resistance to LME of Trials 1 to 3 was evaluated. To this end, for each Trial, two coated steel sheets were welded together by resistance spot welding. The type of the electrode was ISO Type B with a diameter of 16 mm; the force of the electrode was of 5 kN and the flow rate of water of was 1.5 g/min. the welding cycle is reported in Table 1.

TABLE 1

| Welding Schedule | | | | |
|---|---|---|---|---|
| Weld time | Pulses | Pulse (cy) | Cool time (cy) | Hold time (cy) |
| Cycle | 2 | 12 | 2 | 10 |

The number of cracks above 100 μm was then evaluated using an optical as well as SEM (Scanning Electron Microscopy as reported in Table 2.

TABLE 2

| | LME crack details after spot welding (2 layer stack-up condition) | | | | |
|---|---|---|---|---|---|
| Trials | 1$^{st}$ coating | Thickness (μm) | 2$^{nd}$ coating | Thickness (μm) | Number of cracks (>100 μm) per spot weld | Maximum crack length (μm) |
| Trial 1* | Fe - (55%)Ni | 1 | Zn (GI) | 7 | 0 | 0 |
| Trial 2* | Fe - (55%)Ni | 2 | Zn (GI) | 7 | 0 | 0 |
| Trial 3 | — | — | Zn (EG) | 7 | 3 | 760 |

*according to the present invention.

Trials according to the present invention show an excellent resistance to LME compared to Trial 3.

Then, for each Trial, three coated steel sheets were welded together by resistance spot welding under a three layer stack-up configuration. The number of cracks above 100 μm was then evaluated using an optical as well as SEM (Scanning Electron Microscopy) as reported in Table 3.

TABLE 3

| LME crack details after spot welding (3 layer stack-up condition) | | |
|---|---|---|
| Trials | Number of cracks (>100 μm) per spot weld | Maximum crack length (μm) |
| Trial 1* | 1 | 250 |
| Trial 2* | 1 | 450 |
| Trial 3 | 7 | 850 |

*according to the present invention.

Trials according to the present invention show an excellent resistance to LME as compared to Trial 3.

Finally, Trials 1 and 2 then were bent at a 90° angle. An adhesive tape was then applied and removed to verify the coating adhesion with the substrate steel. The coating adhesion of those Trials was excellent.

What is claimed is:

1. A method for the manufacture of a coated steel sheet comprising the following steps:

providing a pre-coated steel sheet coated with a first coating including iron and nickel, wherein the first coating includes from 25 to 90% by weight of nickel and wherein a steel substrate of the pre-coated steel sheet has a steel sheet composition comprising by weight: 0.10<C<0.40%, 1.5<Mn<3.0%, 0.7<Si<2.0%, 0.05<Al<1.0%, 0.75<(Si+Al)<3.0%, and on a purely optional basis, one or more elements including: Nb≤0.5%, B≤0.005%, Cr≤1.0%, Mo≤0.50%, Ni≤1.0%, Ti≤0.5%, a remainder of the composition being made up of iron and inevitable impurities resulting from processing;

thermally treating the pre-coated steel sheet at a temperature between 600 and 1000° C.; and coating the pre-coated steel sheet obtained after the thermally treating step with a second coating based on zinc.

2. The method as recited in claim 1 wherein the first coating includes from 10% to 75% by weight of iron.

3. The method as recited in claim 2 wherein the first coating includes from 25 to 65% by weight of iron.

4. The method as recited in claim 3 wherein the first coating includes from 40 to 60% of weight of iron.

5. The method as recited in claim 1 wherein the first coating includes from 35 to 75% by weight of nickel.

6. The method as recited in claim 5 wherein the first coating includes from 40 to 60% by weight of nickel.

7. The method as recited in claim 1 wherein the first coating consists of iron and nickel.

8. The method as recited in claim 1 wherein the first coating has a thickness equal or above 0.5 μm.

9. The method as recited in claim 8 wherein the first coating has a thickness between 0.8 and 5.0 μm.

10. The method as recited in claim 9 wherein the first coating has a thickness between 1.0 and 2.0 μm.

11. The method as recited in claim 1 wherein the second layer includes above 50% by weight of zinc.

12. The method as recited in claim 11 wherein the second layer includes above 75% by weight of zinc.

13. The method as recited in claim 12 wherein the second layer includes above 90% by weight of zinc.

14. The method as recited in claim 13 wherein the second layer consists of zinc.

15. The method as recited in claim 12 wherein the thermally treating step is performed in an atmosphere including from 1 to 30%, by volume, of $H_2$ at a dew point between −10 and −60° C.

16. The method as recited in claim 1 wherein the thermally treating step is a continuous annealing.

* * * * *